United States Patent [19]

Douglas

[11] 4,014,212
[45] Mar. 29, 1977

[54] THREE-CHAMBER GAS METER

[75] Inventor: Robert Ritson Douglas, Philadelphia, Pa.

[73] Assignee: The Singer Company, New York, N.Y.

[22] Filed: Oct. 8, 1975

[21] Appl. No.: 620,517

[52] U.S. Cl. ............................................. 73/267
[51] Int. Cl.² ...................................... G01F 3/20
[58] Field of Search ............ 73/264, 265, 266, 267, 73/281

[56] References Cited

UNITED STATES PATENTS

| | | | |
|---|---|---|---|
| 1,090,507 | 3/1914 | Thornton et al. | 73/266 |
| 1,246,613 | 11/1917 | Knight | 73/267 |
| 2,932,198 | 4/1960 | Whitworth | 73/267 |
| 3,161,049 | 12/1964 | St. Clair et al. | 73/267 |
| 3,411,358 | 11/1968 | St. Clair et al. | 73/281 |

Primary Examiner—Richard C. Queisser
Assistant Examiner—John P. Beauchamp
Attorney, Agent, or Firm—Edward L. Bell; Robert E. Smith; Harold Weinstein

[57] ABSTRACT

A three-chamber gas meter having a two-chamber cartridge inserted into a casing, the interior of which forms the third chamber. The meter is of compact design and readily mass produced. The cartridge carries a valve plate which communicates to each of the chambers and also to the inlet and the outlet. A rotary valve connected to the valve plate will sequentially and selectively connect the chambers between the inlet and the outlet to measure the gas flow through the meter. A flag and crank assembly is operatively associated with the cartridge to connect the rotary valve and the diaphragms, which expand and contract to actuate the internally connected flag and crank assembly, thus to rotate the rotary valve. A pair of flag rods are journaled in the cartridge and included in the flag and crank assembly.

7 Claims, 29 Drawing Figures

U.S. Patent  Mar. 29, 1977  4,014,212
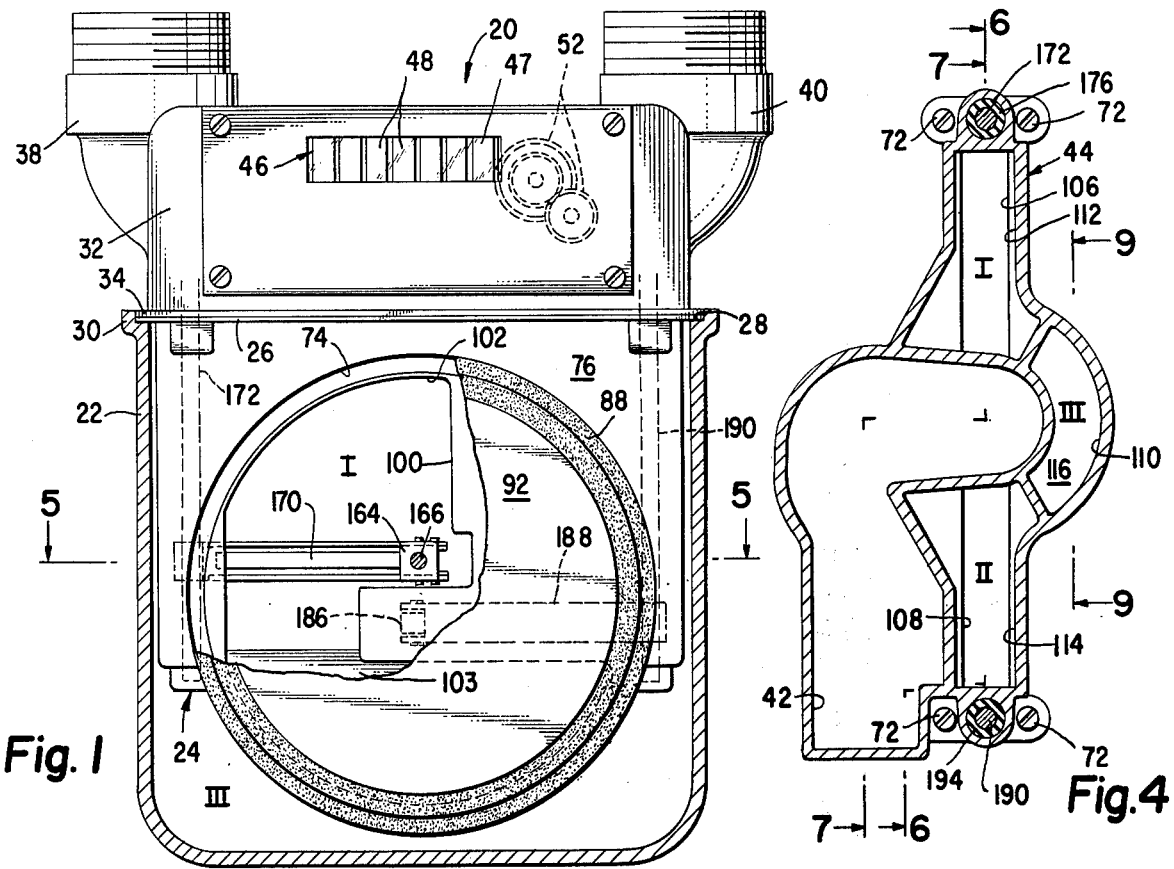
Fig. 1
Fig. 3
Fig. 4
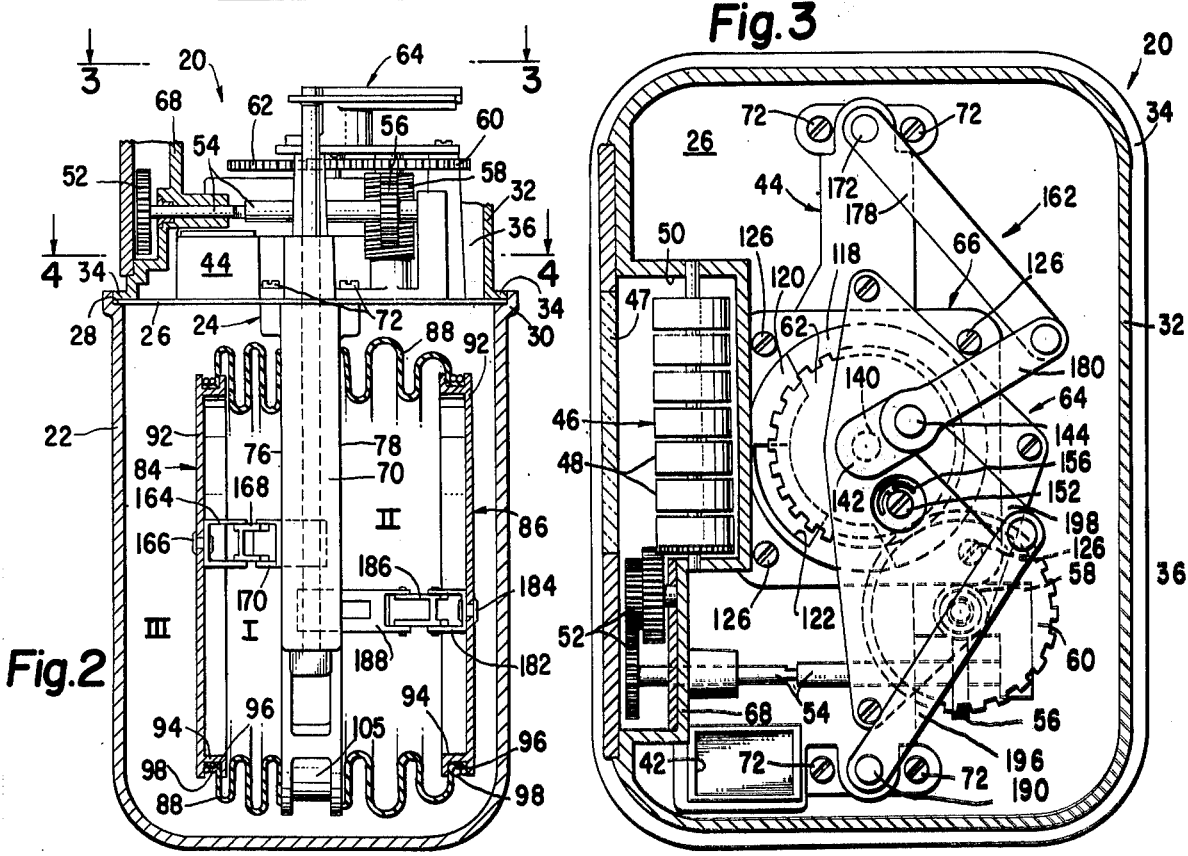
Fig. 2

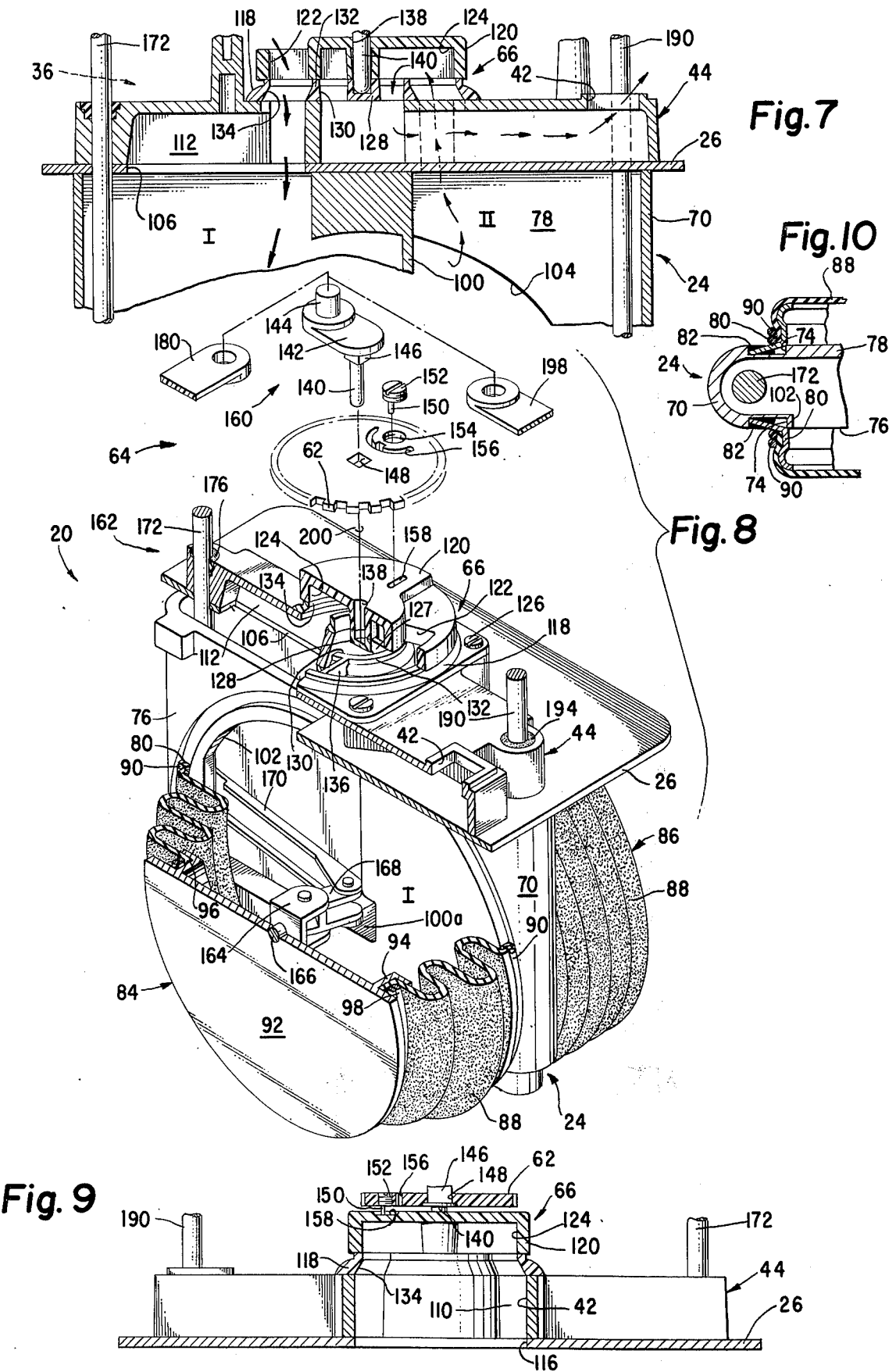

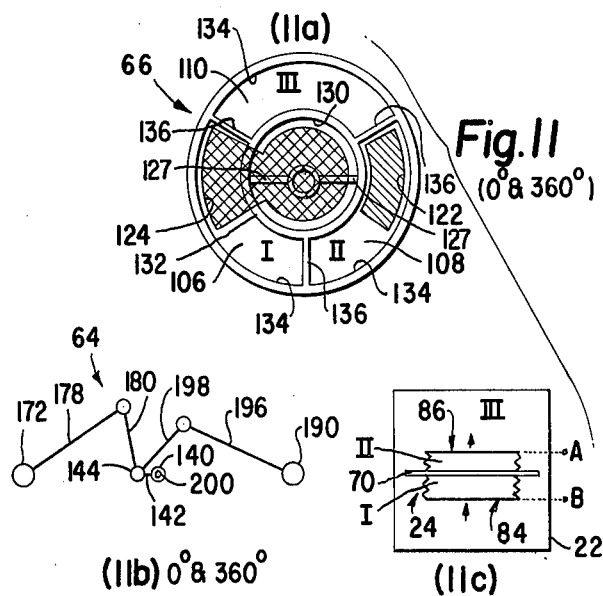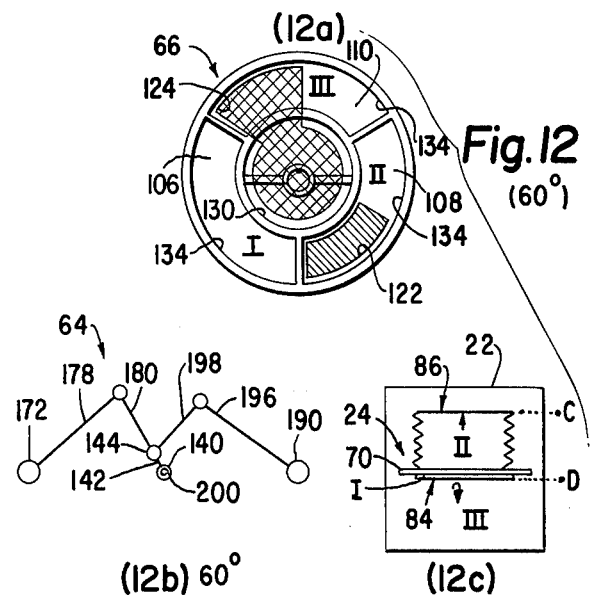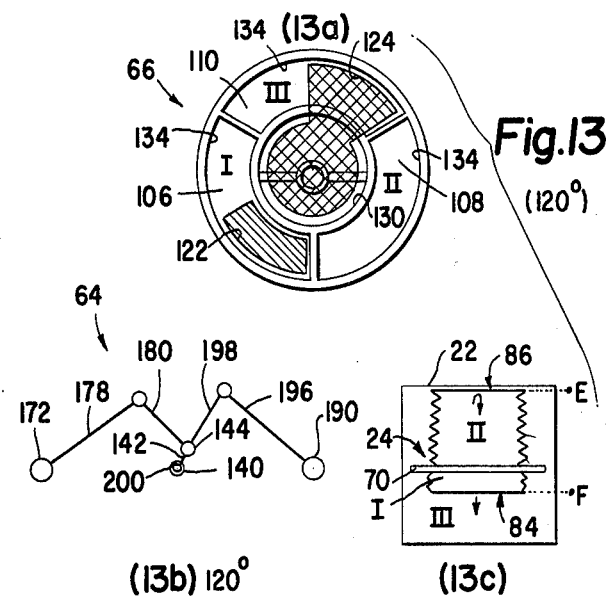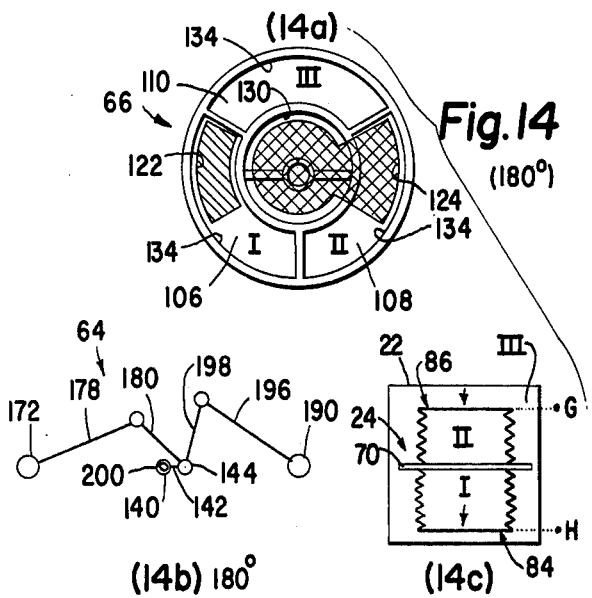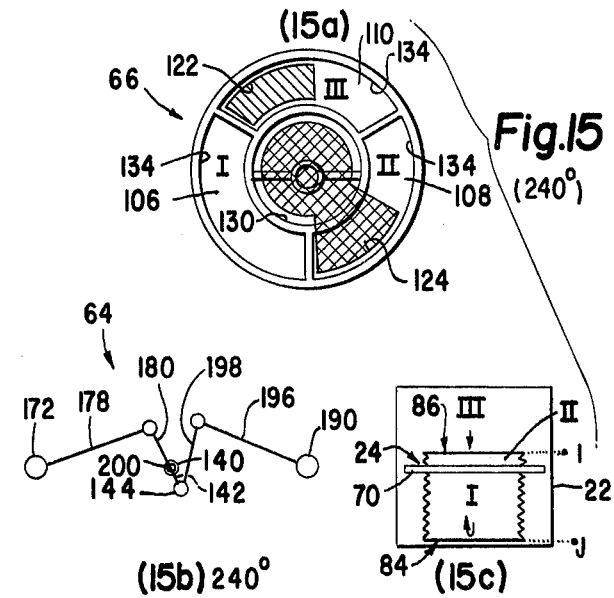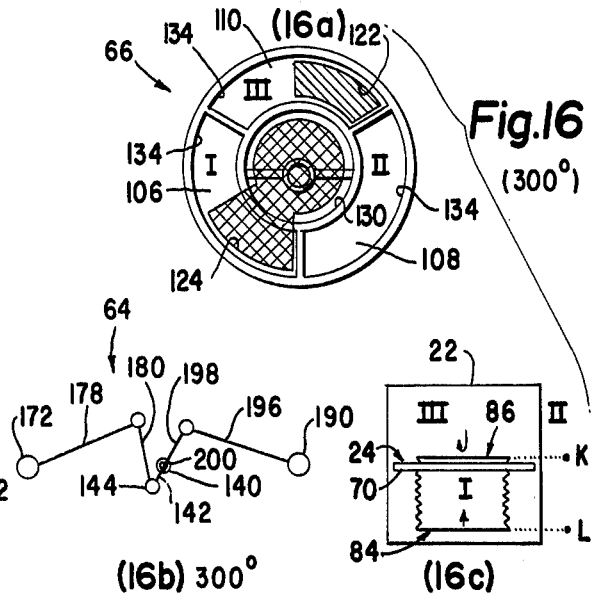

THREE-CHAMBER GAS METER

BACKGROUND OF THE INVENTION

Heretofore, the three-chamber gas meters of the prior art have all required flag assemblies externally connected of the chambers, or to the diaphragms or bellows so as to greatly increase the size of the meter and the complexity of the linkage. Also, the housing and chamber configurations have been bulky. Thus, assembly and subsequent adjustment or accuracy became more complex or difficult to obtain. This also added to the cost of making the meter, especially in mass production thereof.

SUMMARY OF THE INVENTION

It is therefore an object of the present invention to provide an improved three-chambered gas meter which overcomes the prior art disadvantages; which is simple, economical and reliable; which is compact and less costly to mass produce; which uses a two-chamber cartridge inserted into a casing, the interior of which forms the third chamber of the meter; which uses a flag and crank assembly that is internally actuated by the diaphragms to rotate a rotary valve of the measuring system; which uses a single throw crank connected to the flag assembly; which uses a crank assembly having a timing adjustment therein and an index driven therefrom which indicates the quantity of thruput flow in the meter; and which uses a valve plate connected to the cartridge to carry the rotary valve thereon.

Other objects and advantages will be apparent from the following description of one embodiment of the invention, and the novel features will be particularly pointed out hereinafter in the claims.

BRIEF DESCRIPTION OF THE DRAWINGS

This invention is illustrated in the accompanying drawings in which:

FIG. 1 is a front elevational view, partly in section, of a gas meter embodying the present invention.

FIG. 2 is a side elevational view, partly in section, of the gas meter of FIG. 1.

FIG. 3 is a top plan view, partly in section, taken along line 3—3 of FIG. 2.

FIG. 4 is a top plan view, partly in section, taken along line 4—4 of FIG. 2.

FIG. 7 is a front sectional elevational view taken along line 7—7 of FIG. 4.

FIG. 8 is a partially exploded perspective view, partly in section, of the cartridge assembly.

FIG. 9 is a front elevational view, partly in section, taken along line 9—9 of FIG. 4.

FIG. 10 is an enlarged sectional plan view of one end of the cartridge showing details of the diaphragm sealed connection thereto.

FIGS. 11–16 are diagrammatic representations corresponding to (a) the relative position of the rotary valve, (b) the relative angular position of the flag arm and crank assembly, (c) the relative position of the diaphragms and the respective direction of travel thereof, taken for one meter cycle of crank rotation in which each of the respective FIGS. represents 60° of such rotation, starting at 0° (and 360°), and ending at 300°.

DESCRIPTION OF THE INVENTION

Figure 5:
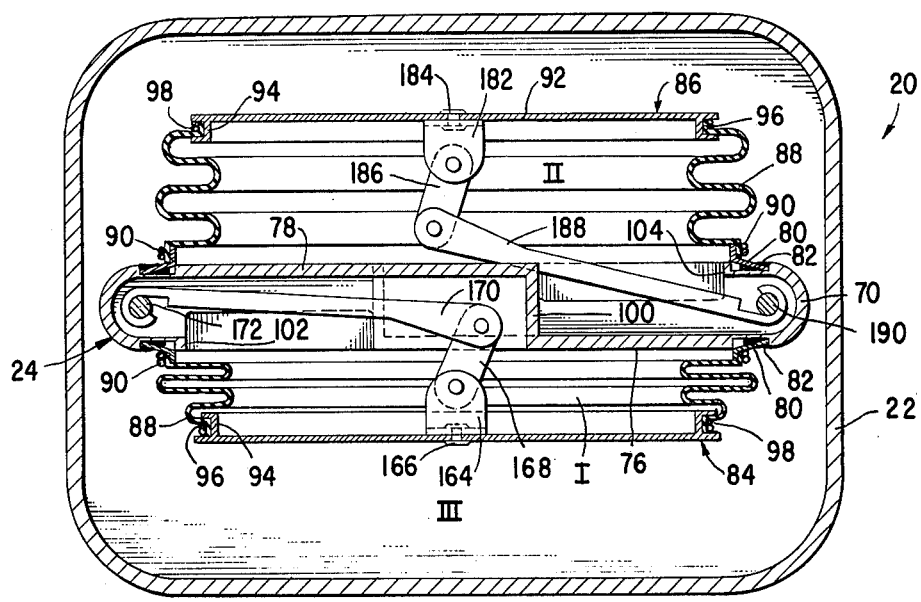
FIG. 5 is a top plan view, partly in section, taken along line 5—5 of FIG. 1.
Figure 6:
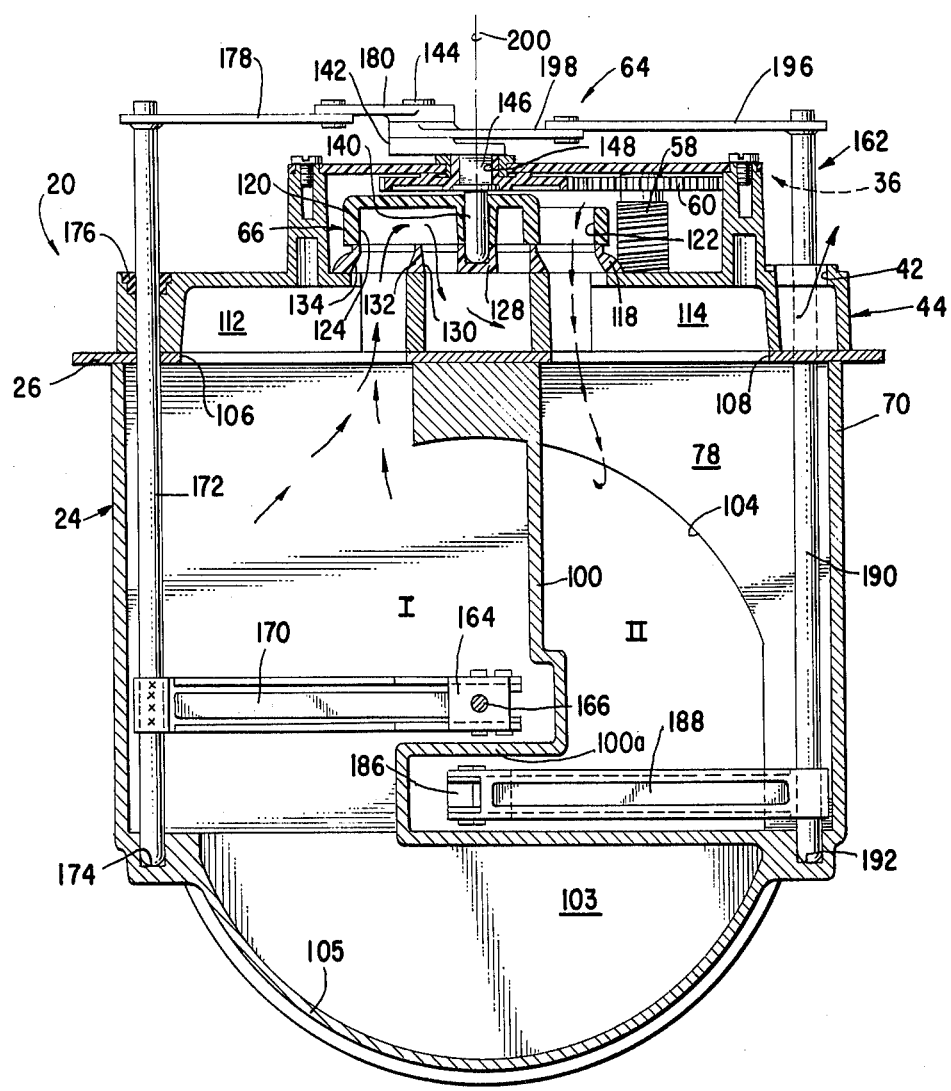
FIG. 6 is a front sectional elevational view taken along line 6—6 of FIG. 4.

In the preferred embodiment of the invention, a three-chamber gas meter, designated generally as 20, of the diaphragm type is depicted in FIGS. 1, 2 and 3. The gas meter 20 includes a housing 22 into which is inserted a two-chamber cartridge assembly 24, having a valve plate 26 thereof substantially rectangularly shaped. The valve plate 26 nests upon an annular shoulder 28 formed by an outwardly stepped flange 30 of the housing 22, to suspend the cartridge assembly 24 within the housing 22. A cover 22 having an outwardly turned flange 34 formed at the bottom thereof sits upon the upper outer edge of the valve plate 26, as shown in FIGS. 1 and 2, and is sealingly connected to the housing flange 30 by suitable means (not shown) to complete the housing assembly.

The interior space of the cover 32, above the valve plate 26 defines an inlet chamber 36 into which gas to be measured in the meter 20 is introduced through an inlet 38, as shown in FIG. 1. An outlet 40 is formed on the side of the cover remote from the inlet 38 as shown in FIG. 1, and is sealingly connected to receive the discharge from the exhaust passage and port 42 of the distribution manifold 44 illustrated in FIGS. 4 and 6–9, which manifold is carried atop the valve plate 26 and affixed thereto by screws 72 shown in FIGS. 2 and 3.

An index 46, viewed through a window 47, shown in FIGS. 1, 2 and 3, has a counter 48 rotatively mounted in an index chamber 50, as best seen in FIG. 3, and driven through a pair of change gears 52 which are connected through a shaft 54 carrying a wheel 56 driven by a worm 58, as shown in FIGS. 1, 2 and 3. The worm 58 is affixed to a shaft carrying a gear 60 driven by a drive gear 62 which is part of the flag and crank assembly 64, which connects to and rotates the valve assembly 66 of the meter 20, as illustrated in FIGS. 8 and 9. The shaft 54 is sealingly journaled in the partition wall 68 which separates the index chamber 50 from the inlet chamber 36, each of which are formed within the cover 32.

The cartridge assembly 24 includes a columnar frame 70 affixed to the distribution manifold 44 by any suitable method, for example, which acts to sandwich the valve plate 26 therebetween, as illustrated in FIGS. 2 and 3, so that the columnar frame 70 is suspended from plate 26 within the housing 22. The columnar frame 70 has annular recesses 74, 74 which are formed on the oppositely facing longitudinal walls 76 and 78, as illustrated in FIGS. 5, 8 and 10, to have the annular bellows member 80 cemented therein as at 82 or staked (not shown) to sealingly connect the bellows assemblies 84 and 86 respectively, to the frame 70. Each of the bellows assemblies 84 and 86 are substantially identical except for the location of the connection of the flag assembly 162 thereto. Each of the bellows assemblies 84 and 86 include an expandable and contractable diaphragm sleeve 88 which at its inner end, is press fitted about the connecting member 80 and is fixedly held in place by a wire wrap 90. The open front end of the diaphragm sleeve 88 is closed by a vertically disposed front disc member 92 having an inwardly extending annular flange 92 turned radially outwardly to form an annular recess 96, that receives the front portion of the diaphragm sleeve 88 that is secured thereto by a wire wrap 98. The wire wraps 90 and 98 respectively, are sufficient to seal the diaphragm sleeve 88 to the connecting and disc members 80 and 92; however, the components may also be cemented if desired.

The columnar frame 70, as shown in FIGS. 1 and 5–8, has an internal partition 100 offset from the vertical midpoint to separate the delivery of gas to the respective bellows assemblies 84 and 86. The partition 100 extends between the oppositely disposed front walls 76 and 78 with an enlarged aperture 102 formed in the wall 76, and an enlarged aperture 104 formed in the wall 78. The partition 100 includes a lower partition 103 formed below apertures 102 and 104 which terminates in an arcuate bottom wall 105 shown in FIGS. 2 and 6.

The bellows assembly 84 defines a front chamber, which is nominally designated chamber I; the bellows assembly 86 defines a rear chamber, nominally designated chamber II; and the casing below the valve plate 26 defines a casing chamber, nominally designated chamber III. The valve plate 26 has three ports, port 106 to communicate with chamber I, port 108 to communicate with chamber II, and port 110 to communicate with chamber III, as illustrated in FIGS. 4, 6, 7 and 8. The distribution manifold 44 sits atop the valve plate 26 and has port passage 112 formed in alignment with aperture 106, port passage 114 in alignment with aperture 108, and port passage 116 in alignment with aperture 110.

Distribution of the gas to the chambers I, II and III, is made possible by the valve assembly 66 which includes a valve seat 118 through which each of the respective port passages 112, 114 and 116, extend to be controlled by a rotary valve 120 of the valve assembly 66, which operates thereover, to sequentially connect the inlet chamber 36 through an inlet opening 122 in the rotary valve 120 for filling of the chambers I, II and III, respectively. An exhaust cavity 124 alternately connects the port 106, 108, and 110 through the port passages 112, 114, and 116, to the discharge port 42 for exhausting the measuring chambers I, II and III, respectively. The valve seat 118 is mounted to the distribution manifold 44 shown in FIGS. 3 and 8. The valve seat 118 has ribs 127, 127 which support a bearing boss 128 illustrated in FIGS. 8 and 11, which boss is thereby suspended within the central opening 130, in which ribs 127 extend, so as to communicate the exhaust cavity 124 with the exhaust port 42. An annular member 132 of the valve seat 118 separates the exhaust opening 130 from the plurality of radially outwardly individual openings 134 connected respectively to the port passages 112, 114 and 116. The openings 134 are separated from each other by ribs 136 illustrated in FIGS. 8 and 11.

The rotary valve 120 has a central opening 138 shown in FIGS. 7 and 8 and is positioned in alignment with the bearing boss 128 by a shaft 140 which passes therethrough to journal within the bearing boss 128. The shaft 140 is formed integrally with a crank or tangent 142 having a crank rod 144 formed at its outer end to extend in the opposite direction of the shaft 140. A square section 146 is formed at the top of the shaft 140 adjacent the crank 142 and affixed within a square hole 148 formed in the drive gear 62, so that rotation of the crank 142 will cause a like rotation of the drive gear 62. The drive connection between the drive gear 62 and the rotary valve 120 illustrated in FIGS. 3, 8 and 9, is made by a drive pin 150 eccentrically mounted on a timing adjustment screw 152 threadedly received in an aperture 154 formed radially outwardly of an arcuate expansion slot 156 of the drive gear 62. The pin 150 is engaged in a drive slot 158 which extends in a radial direction from the hole 138 on the upper surface of the rotary valve 120. The drive pin 150 may be adjusted within the drive slot 158 to accordingly advance or retard the timing of the rotary valve 120, as illustrated in FIG. 9, in a manner well known in the art. The crank assembly 160 is made up of the crank 142 and associated parts thereof, needed to transmit the power to the rotary valve 120, including the drive pin 150 and the drive slot 158. The crank assembly 160 is a part of the flag and crank assembly 64, which also includes the flag assembly 162. The flag assembly 162 is constructed to provide the crank assembly 160 with a 60° phasing necessary for a single throw connection at the crank rod 144.

The flag assembly 162 is shown in FIGS. 1–8 in the preferred embodiment of the invention to be disposed within the cartridge assembly 24 to be internally connected to the bellows assemblies 84 and 86, whereby expansion and contraction thereof will cause the flag assembly 162 to rotate the crank assembly 160, thus rotating the rotary valve 120. The portion of the flag assembly 162 mounted within a chamber I, includes a bracket 164 sealingly affixed to the front disc member 92 by a rivet 166 at a location slightly above the center of the disc, and above the upper horizontal portion 100a of the partition 100. A short bracket link 168 is pivotally connected at each end between the bracket 164 and the movable end of a long bracket link 170, the other end of which is affixed to a vertical flag rod 172. The flag rod is journaled at its lower end in a bearing boss 174 formed in the frame 70 at one side thereof, and inwardly at the top thereof in a bushing 176 inserted into the distribution manifold 44. The fixed end of a long flag arm 178 is affixed to the upper end of the flag rod 172 which extends into the inlet chamber 36, with the movable end thereof pivotally connected to a short flag arm 180, the other end of which is pivotally received upon the crank rod 144. The flag rod 172 and associated parts are disposed on the left hand side of FIGS. 1, and 5–8, and are operated responsive to the expansion and contraction of chamber I. The portion of the flag assembly 162 associated with chamber II, is depicted on the right hand side of FIGS. 1, and 5–8. A bracket 182 is sealingly connected to the front disc member 92 of the bellows assembly 86 of chamber II by a rivet 184 at a location below the center thereof, so as to lie beneath the bracket 164 and the links 168 and 170 positioned in chamber I, so that any expansion or retraction movement in either chamber I or chamber II of the flag assembly 162 will be overlapping and not interfere with one another. Also, such an overlapping construction takes up the smallest depth as shown in FIG. 5 which slim profile would not be possible if each link were placed on the same horizontal plane. A short bracket link 186 is pivotally interconnected between the bracket 182 and the movable end of a long bracket link 188, the other end of which is affixed to a vertical flag rod 190. The flag rod 190 is journaled on the right side of the columnar frame 70, within a lower bearing boss 192 and extends through an upper bushing 194, shown in FIG. 8. The upper end of the flag rod 190 extends into the inlet chamber 36 and has affixed thereto an end of a long flag arm 196 the other end of which is pivotally interconnected by a short flag arm 198 to the crank rod 144. Motion of the flag assembly 162 will cause the crank assembly 160 to rotate about an axis of rotation 200, illustrated in FIGS. 6 and 8.

The cartridge 24 constitutes a self-contained subassembly which embodies all of the operative assemblies of the meter 20 except that of the index 46.

The operation of the gas meter 20 will be best understood by referring to FIGS. 11–16 and 17, wherein the operative assemblies are diagrammatically represented during one meter cycle in their respective individual positions during each 60° of rotation corresponding to one meter cycle of crank rotation, wherein the (a) portion of the figure depicts the valve assembly 66 and the (b) portion of the figure depicts the flag and crank assembly 64, and the (c) portion of the figure depicts the bellows assemblies 84 and 86 with respect to the chambers I, II and III. In FIG. 11, the crank 142 is shown at 0° at the beginning of the cycle in FIG. 11b, which position also corresponds to the crank at 360° at the end of the cycle. With the crank at 0° the rotary valve 120 is discharging from chamber I, as indicated by the double crossed hatched lines, while simultaneously introducing gas into chamber II, as indicated by the single hatched lines. With the crank in the 0° position, the respective bellows assemblies 84 and 86 as shown in FIG. 11c wherein the bellows assembly 84 is retracting while the bellows assembly 86 is expanding. This is further illustrated in FIG. 17 by the reference points A and B, which are also placed opposite the location of the respective front members of assemblies 84 and 86 of FIG. 11c. Correlation of FIGS. 11c and 17 signifies that with the crank at 0°, chamber I, at point B of the curved line 202, continues to exhaust; chamber II, at point A of the curved line 204 continues to expand; while chamber III, represented by both the area above line 204 and the area below line 202, has completed filling and will subsequently begin to exhaust.

Figure 17:
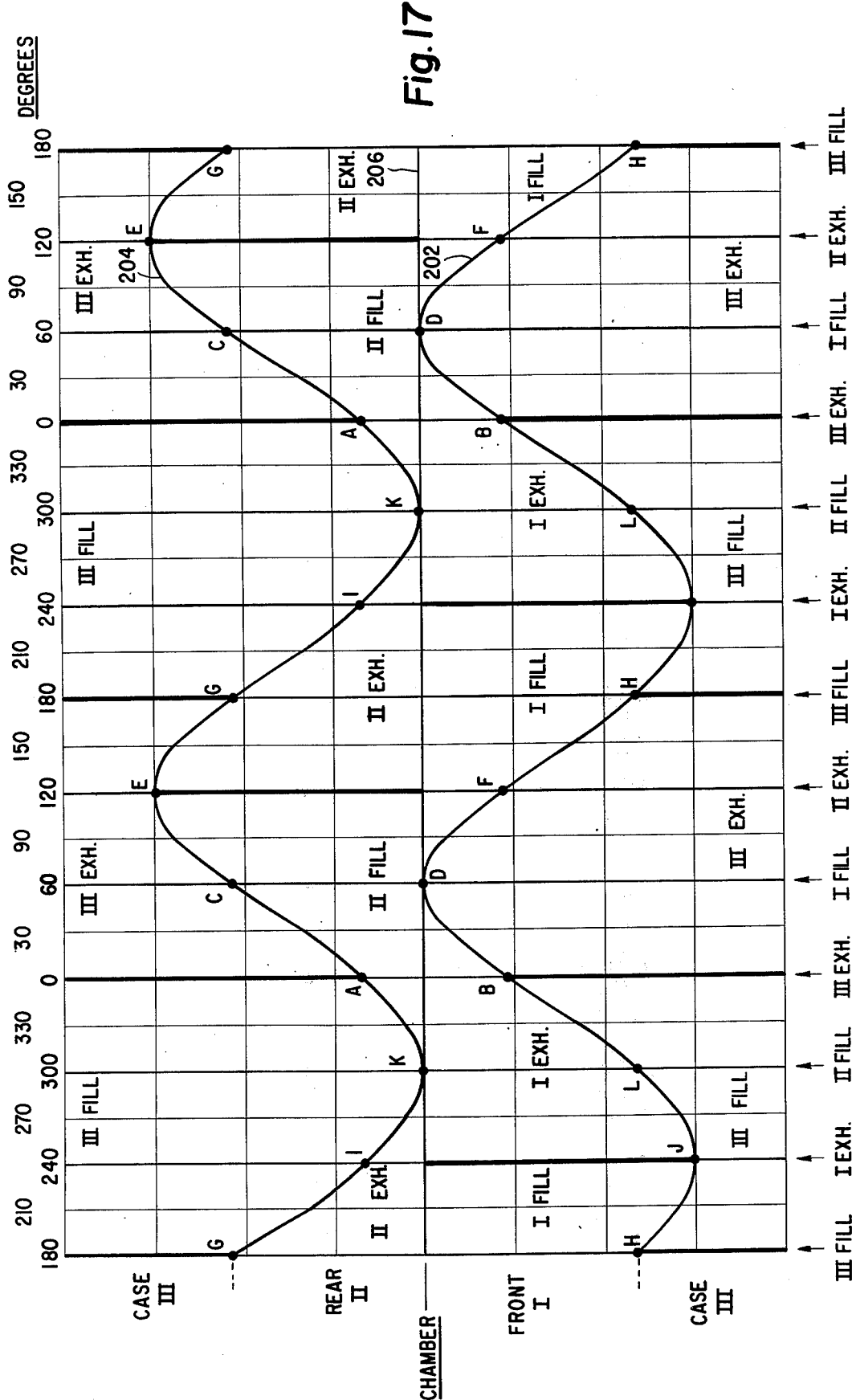
FIG. 17 is a graphical representation of a meter cycle charted as angular degrees of crank rotation versus chamber diaphragm position, with the curves showing the relative position of the diaphragms cross-reference to the FIGS. 11c–16c by the letter reference characters with the area under the curves indicating when the respective chambers are filling or emptying.

The midpoint line 206 of FIG. 17 represents the partition 100 of the frame 70 wherein the chamber I is separated from the chamber II. The area between the line 206 and the curved line 202 corresponds to the relative condition of chamber I and indicates whether the chamber is filling or exhausting corresponding to the bellows assembly 84 expanding or contracting. The area between the midpoint line 206 and the curved line 204 represents the relative condition of chamber II and indicates whether chamber II is filling or exhausting corresponding to the relative position of the bellows assembly 86 expanding or contracting. The remaining area shown in FIG. 17, namely the area above the curved line 204, and below the curved line 202, represents chamber III, the casing chamber, which is formed between the housing 22 and the exterior of the cartridge 24 below the valve plate 26. While the total of the three areas of chambers I, II and III remains constant, the area of the chamber III will always be equal to the total casing area minus the area of chambers I and II. Therefore, the area of chamber III is dependent upon the position of the bellows assemblies 84 and 86, and is expanded and contracted responsive thereto.

Turning to FIG. 12 with the crank assembly 160 at 60° as shown in FIG. 12b, wherein FIG. 12a indicates that the rotary valve 120 is positioned to exhaust chamber III, while chamber II continues to expand. Chamber I has completed its exhaust phase as shown in FIG. 12c and FIG. 17, with the reference points D and C with the crank at 60° to indicate that chamber I is completely exhausted, chamber II continues to fill, while chamber III continues to exhaust.

The crank assembly 160 is at 120° in FIG. 13b, wherein the valve assembly 66 shown in FIG. 13a is positioned to complete the exhaustion of chamber III, with chamber I being filled. The diagram of FIG. 13c and FIG. 17 indicate that reference points E and F have been reached on the respective curved lines 204 and 202, so that the bellows assembly 86 of chamber II will begin to contract while the bellows assembly 84 of chamber I continues to expand, and chamber III continues to exhaust.

The crank assembly 160 is at 180° in FIG. 14b, with the valve assembly 66 shown in FIG. 14a exhausting chamber II, continuing to fill chamber I, and about to start to filling chamber III, as illustrated in FIGS. 14c and FIG. 17 at the reference points G and H at the intersection of the 180° line with curves 204 and 202 respectively.

The cycle has advanced with the crank assembly 160 at 240° in FIG. 15b, wherein the valve assembly 66 is depicted in FIG. 15a to be continuing to exhaust chamber II and having completed filling of chamber I, to be filling chamber III, as shown in FIGS. 15c and FIG. 17 by the reference point I and J at the respective intersection of the 240° line with curves 204 and 202 respectively.

The crank assembly is at 300° in FIG. 16b, wherein the valve assembly 66 is depicted in FIG. 16a to have completed exhausting chamber II, partially having exhausting chamber I, and continuing to fill chamber III, as illustrated in FIGS. 16 i c and FIG. 17 by reference points K and L, which appear at the intersection of the 300° line with curves 204 and 202 respectively.

It will be understood that various changes in the details, arrangements of parts and operating conditions which have been herein described and illustrated in order to explain the nature of the invention, may be made by those skilled in the art within the principles and scope of the invention.

Having thus set forth the nature of the invention, what is claimed herein is:

1. A three-chamber gas meter comprising:
    a. a hollow casing having an open top,
    b. a two chamber cartridge having a transverse valve plate detachably secured to enclose the casing top upon the cartridge being inserted into the casing to form a third chamber within the casing surrounding the two cartridge chambers,
    c. a cover detachably secured to the casing over the valve plate to form an inlet chamber,
    d. an inlet connected to the cover to communicate with the inlet chamber,
    e. an outlet connected to the cover,
    f. an outlet aperture formed in the valve plate in communication with the outlet,
    g. a pair of diaphragms connected to the cartridge, one to each of the cartridge chambers thereof to independently expand and contract responsive to gas flow through the valve plate, h. a rotary valve connected to the valve plate to control the flow of gas to and from the three chambers sequentially from the inlet to the outlet of the gas meter,
i. a crank assembly connected to rotate the rotary valve,
j. an index mounted in the casing and connected to the crank assembly to indicate the volume of gas flowing through the meter,
k. a pair of flag assemblies separately internally connected within the cartridge at one end thereof to one or the other of the diaphragms, and at the other end to actuate the crank assembly responsive to expansion and contraction of the diaphragms
   1. a pair of flag rods journaled internally within the cartridge, one for each flag assembly, with each flag rod extending above the valve plate whereby the flag assemblies connect to the crank assembly within the inlet chamber.

2. The combination claimed in claim 1 wherein:
a. the cartridge internally partitioned to form separate passages communicating with one or the other of the diaphragms, whereby the cartridge is carries two separate chambers with the third chamber being formed within the casing,
b. the valve plate communicates separately with each of the chambers and with the inlet and the outlet, whereby the rotary valve sequentially times the flow of gas through the meter.

3. The combination claimed in claim 2 wherein:
a. each of the flag assemblies includes a pair of flag arms connected between the flag rods and the crank assembly, and a linkage mechanism is disposed within the cartridge one on either side of the partition therein to connect between the flag rods and one or the other of the diaphragms on the inside of the respective cartridge chambers.

4. The combination claimed in claim 3 wherein:
a. the partition is non-linear adjacent the diaphragm connection of the linkage mechanisms,
b. one of the linkage mechanisms is connected between the flag rod and the diaphragm vertically above the other to prevent interference therebetween.

5. A three chamber gas meter comprising:
a. a casing having an inlet and an outlet,
b. a cartridge connected to the casing to form a casing chamber thereabout,
c. a pair of diaphragms, each having an internal side and an external side, connected to the cartridge on opposite sides thereof to form a pair of separate cartridge chambers at the internal sides thereof, and each of the external sides of the diaphragms lying in the casing chamber,
d. a rotary valve connected to the cartridge successively to communicate each of the chambers to the inlet and the outlet in a predetermined timed sequence to measure the gas flow through the meter,
e. a crank assembly operatively connected to the rotary valve,
f. a flag assembly having one end disposed internally in the cartridge separately and individually to connect to each of the diaphragms on the internal side thereof, and the other end connected to the crank assembly whereby the rotary valve will be rotated responsive to the separate expansion and contraction of the diaphragms.

g. the flag assembly including pairs of flag rods, linkages and flag arms,
h. the pair of flag rods journaled in the cartridge,
i. the pair of linkages separately to connect individual cartridge chambers with one flag rod and one diaphragm on the internal side of one chamber, and the other flag rod on the other diaphragm on the internal side of the other chamber,
j. the pair of flag arms connected between the crank and one or the other of the flag rods to continuously rotate the rotary valve responsive to expansion and contraction of the diaphragms,
k. the cartridge including an internal partition to form separate passages communicating with one or the other of the cartridge chambers,
l. the cartridge including a manifold separately communicating each of the chambers with the rotary valve,
m. the cartridge is centrally disposed within the casing, and
n. the pair of linkages internally connected between the flag rod and the diaphragm on the internal side thereof are disposed one above the other to prevent interference with the movement of either.

6. The combination claimed in claim 5 wherein:
a. a valve plate connected to the cartridge to extend transversely of the casing to separate the inlet from the casing chamber,
b. a cover detachable connected to the casing to inclose the valve plate,
c. the inlet and the outlet connected through the cover to separately communicate with the valve plate.

7. A three chamber gas meter comprising:
a. a casing having an inlet and an outlet,
b. a cartridge connected to the casing to form a casing chamber thereabout,
c. a pair of diaphragms, each having an internal side and an external side, connected to the cartridge to form a pair of separate cartridge chambers at the internal sides thereof, and each of the external sides of the diaphragms lying in the casing chamber,
d. a rotary valve connected to the cartridge successively to communicate each of the chambers to the inlet and the outlet in a predetermined timed sequence to measure the gas flow through the meter,
e. a crank operatively connected to the rotary valve,
f. the crank is journaled in the rotary valve to rotate about a fixed axis,
g. a flag assembly having one end disposed internally in the cartridge separately and individually to connect to each of the diaphragms on the internal side thereof, and the other end connected to the crank whereby the rotary valve will be rotated responsive to the separate expansion and contraction of the diaphragms,
h. the rotary valve has a radial drive slot therein,
i. a drive pin is rotatively mounted in the crank to engage the drive slot at a predetermined radial distance to rotate the rotary valve at a corresponding speed upon rotation of the crank, and
j. the drive pin has an eccentric portion whereby on rotation of the drive pin connection to the crank the portion of the drive pin engaging the drive slot will shift to a smaller radial distance or a larger radial distance to permit adjustment of the rotation of the rotary valve relative to the crank to advance or retard the same.

* * * * *